US008527713B2

(12) United States Patent
Augsburg et al.

(10) Patent No.: US 8,527,713 B2
(45) Date of Patent: Sep. 3, 2013

(54) CACHE LOCKING WITHOUT INTERFERENCE FROM NORMAL ALLOCATIONS

(75) Inventors: Victor Roberts Augsburg, Cary, NC (US); James Norris Dieffenderfer, Apex, NC (US); Jeffrey Todd Bridges, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1469 days.

(21) Appl. No.: 11/343,765

(22) Filed: Jan. 31, 2006

(65) Prior Publication Data

US 2007/0180199 A1     Aug. 2, 2007

(51) Int. Cl.
| G06F 12/00 | (2006.01) |
| G06F 13/00 | (2006.01) |
| G06F 13/28 | (2006.01) |
| G06F 3/00 | (2006.01) |
| G06F 5/00 | (2006.01) |

(52) U.S. Cl.
USPC ........... 711/145; 711/118; 711/133; 711/144; 710/48

(58) Field of Classification Search
USPC ................. 711/118, 133, 144, 145; 710/48
See application file for complete search history.

(56) References Cited

U.S. PATENT DOCUMENTS

| 5,185,878 A | | 2/1993 | Baror et al. | |
| 5,249,286 A | * | 9/1993 | Alpert et al. | 711/125 |
| 5,371,872 A | * | 12/1994 | Larsen et al. | 711/118 |
| 5,822,764 A | | 10/1998 | Hardage, Jr. et al. | |
| 6,438,655 B1 | * | 8/2002 | Nicol et al. | 711/136 |
| 2002/0007441 A1 | * | 1/2002 | Palanca et al. | 711/133 |
| 2005/0044320 A1 | * | 2/2005 | Olukotun | 711/118 |
| 2005/0055506 A1 | * | 3/2005 | DeMent et al. | 711/133 |
| 2005/0251630 A1 | * | 11/2005 | Matthews et al. | 711/138 |

FOREIGN PATENT DOCUMENTS

| JP | 1237835 A | 9/1989 |
| JP | 5216687 A | 8/1993 |
| JP | 2001005658 A | 1/2001 |
| KR | 20050070012 | 7/2005 |

OTHER PUBLICATIONS

International Search Report—PCT/US07/061415, International Search Authority—European Patent Office—Jun. 26, 2007.
Written Opinion—PCT/US07/061415, International Search Authority—European Patent Office—Jun. 26, 2007.

* cited by examiner

*Primary Examiner* — Ryan Bertram
(74) *Attorney, Agent, or Firm* — Nicholas J. Pauley; Sam Talpalatsky; Joseph Agusta

(57) ABSTRACT

A Block Normal Cache Allocation (BNCA) mode is defined for a processor. In BNCA mode, cache entries may only be allocated by predetermined instructions. Normal memory access instructions (for example, as part of interrupt code) may execute and will retrieve data from main memory in the event of a cache miss; however, these instructions are not allowed to allocate entries in the cache. Only the predetermined instructions (for example, those used to establish locked cache entries) may allocate entries in the cache. When the locked entries are established, the processor exits BNCA mode, and any memory access instruction may allocate cache entries. BNCA mode may be indicated by setting a bit in a configuration register.

21 Claims, 3 Drawing Sheets

CACHE LOCKING WITHOUT INTERFERENCE FROM NORMAL ALLOCATIONS

FIELD

The present disclosure relates generally to the field of processors and in particular to a method of cache locking without interference from normal allocations.

BACKGROUND

Microprocessors perform computational tasks in a wide variety of applications, including portable electronic devices. Maximizing processor performance can be desirable, to permit additional functions and features to be implemented in portable electronic devices and other applications.

Due to the spatial and temporal locality characteristics of common in computer programs, the instructions and data being processed at any given time are statistically likely to be needed in the very near future, and may be retained in a high-speed, cache memory, where they are quickly available. Memory access instructions present a portion of a (virtual or physical) address, known as a tag, to a CAM structure in the cache, where it is compared against the corresponding address bits of instructions and/or data stored in the cache's RAM (the CAM and RAM contents together are referred to herein as a cache entry). If the tag matches, or "hits," a cache line is returned that contains the desired instructions and/or data (or, in the case of set-associative caches, a plurality of cache lines are returned, and one is selected by a different portion of the address known as the index). If the tag fails to match any CAM entry, it "misses," and the memory access instruction proceeds to access the desired instruction or data from main memory.

It is commonly desirable to maximize the overall cache hit rate, thus minimizing off-chip accesses to main memory, which can incur latency, stall the pipeline, and consume additional power. Additionally, in some applications, a few critical or often used instructions and/or data may be known, and this information may be maintained in the cache, regardless of the cache's overall performance. Some instruction set architectures provide the means to "lock" a cache entry, so that the entry is not replaced during normal cache miss processing. In some cases, the selection of cache entries to lock is explicit and precise, so as to minimize the impact of locked entries on normal cache allocation algorithms.

FIG. 1 is a functional block diagram depicting one representative means of locking cache entries. The cache 1, which may comprise an instruction cache, a data cache, or a unified cache, includes n entries, numbered from 0 to n−1. A FLOOR register 2 holds the entry number that represents the "floor" of the cache, or the lowest cache entry available for normal allocation. Cache entries below the floor are not available for replacement, and are hence "locked." If no entries are locked, the FLOOR register contains a 0, and the cache replacement algorithm operates throughout the cache. If, as depicted in FIG. 1, the bottom three entries are locked, the processor will increment the FLOOR register to three, the first cache entry available for reallocation. The normal cache reallocation algorithm in this case operates in the portion of the cache from the "floor," or three, to the top of the cache, n−1.

Grouping the locked cache entries in one place simplifies the replacement algorithm. For example, if cache entries are replaced on a round-robin basis, only the "rollover" point is affected by the locked entries (i.e., when incrementing past n−1, the next entry is that pointed to by the FLOOR register 2 rather than 0). There are no non-contiguous, locked entries scattered across the cache space that must be "skipped over" by a round-robin allocation. Note that the FLOOR method of grouping and locking cache entries is representative only, and is not limiting. Cache entries may be grouped together and locked against reallocation according to a broad variety of methods.

Interrupts are, generally generated by events outside of the processor, and may be non-determinate in nature. Thus, interrupts may occur during the execution of code that attempts to carefully arrange locked cache entries. The interrupt-handling code may include memory access instructions, that are likely to miss in the cache, causing accesses to main memory. These memory accesses will normally generate allocations in the cache. That is, instructions and data fetched to service the interrupt will replace some cache lines. If the interrupts occur after locked cache entry processing has begun, but before the locked entries are established and arranged, cache entries that were meant to be locked may be reallocated. Additionally, non-locked cache entries may be allocated in an area intended for locked entries, such as below the FLOOR register. This may result in non-contiguous locked entries, imposing a significant burden on some cache replacement algorithms, such as round-robin.

SUMMARY

In one or more embodiments, a Block Normal Cache Allocation (BNCA) mode is defined. When the processor enters BNCA mode, cache entries may only be allocated by predetermined instructions. Normal memory access instructions (for example, as part of interrupt code) may execute and will retrieve data from main memory in the event of a cache miss; however, these instructions are not allowed to allocate entries in the cache. Only the predetermined instructions (for example, those used to establish locked cache entries) may allocate entries in the cache. When the locked entries are established, the processor exits BNCA mode, and any memory access instruction may allocate cache entries. BNCA mode may be indicated by setting a bit in a configuration register.

One embodiment relates to a method of restricting allocations in a cache. In a restricted mode, only a predetermined set of instructions is allowed to allocate cache entries. In a non-restricted mode, any memory access instruction is allowed to allocate cache entries.

Another embodiment relates to a method of managing a cache. A restricted mode is entered wherein only predetermined instructions may allocate cache entries. Cache entries are allocated using the predetermined instructions. The restricted mode is exited and cache entries for any memory access instruction are allocated.

Another embodiment relates to a processor. The processor includes a cache memory and a configuration register having a Block Normal Cache Allocation (BNCA) bit. The processor additionally includes a cache controller operative to control the allocation of entries in the cache by memory access instructions, and further operative to disallow said allocation, except for a predetermined set of instructions, when the BNCA bit is set.

DETAILED DESCRIPTION

Figure 1:
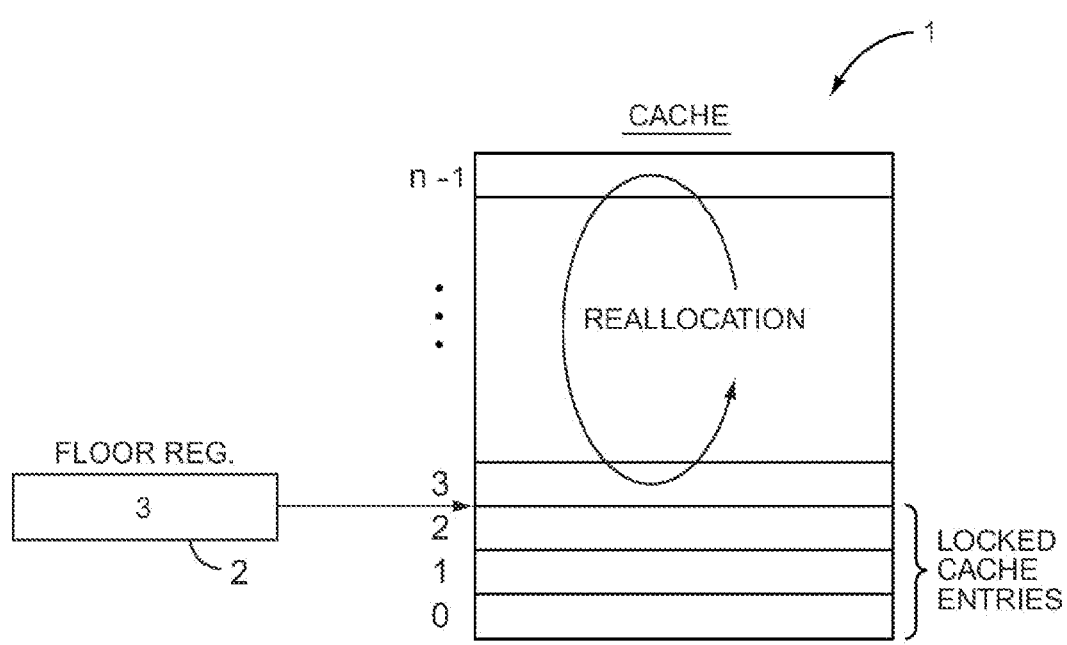
FIG. 1 is a functional block diagram of a cache memory and a FLOOR register.
Figure 2:
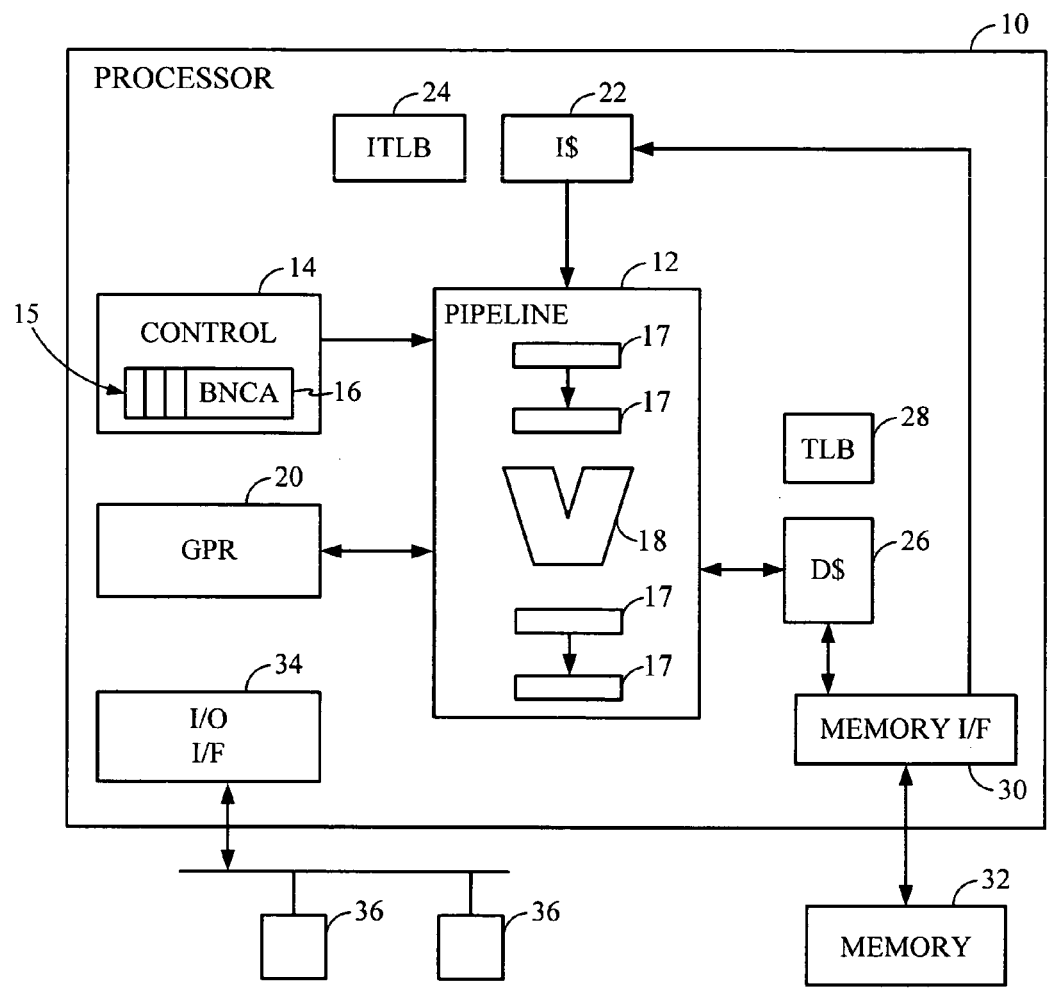
FIG. 2 is a functional block diagram of a processor.

FIG. 2 depicts a functional block diagram of a representative processor 10, employing both a pipelined architecture and a hierarchical memory structure. The processor 10 executes instructions in an instruction execution pipeline 12 according to control logic 14. Included in control logic 14 is a configuration register 15, which includes a Block Normal Cache Allocation (BNCA) bit 16, described in greater detail below. The pipeline includes various registers or latches 17, organized in pipe stages, and one or more Arithmetic Logic Units (ALU) 18. A General Purpose Register (GPR) file 20 provides registers comprising the top of the memory hierarchy.

The pipeline fetches instructions from an Instruction Cache (I-cache) 22, with memory addressing and permissions managed by an Instruction-side Translation Lookaside Buffer (ITLB) 24. Data is accessed from a Data Cache (D-cache) 26, with memory addressing and permissions managed by a main Translation Lookaside Buffer (TLB) 28. In various embodiments, the ITLB 24 may comprise a copy of part of the TLB 28. Alternatively, the ITLB 24 and TLB 28 may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30.

The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches 22, 26. In addition, one or more of the functional blocks depicted in the processor 10 may be omitted from a particular embodiment.

Commonly instruction set architectures to include memory access instructions that only allocate cache entries, without reading instructions or data into the pipeline. For example, a PLD (preload) instruction reads an address in main memory. If the PLD misses in the relevant cache, the data from memory is read and loaded into the cache, replacing an existing cache entry. The PLD instruction may be used by a program to preload certain critical instructions and/or data into an I-cache 22 and/or D-cache 26, respectfully, to ensure that subsequent code accessing the instructions and/or data will hit in the relevant cache 22, 26. The program may use the PLD instruction in conjunction with writing to the FLOOR register (or other locking mechanism) to lock the preloaded entries in the cache 22, 26 against replacement by other memory access operations. However, an interrupt received during this processing may upset the desired preloading and cache entry locking operation.

According to one or more embodiments, the processor 10 may enter a mode wherein only predetermined instructions may allocate cache entries. The mode may be entered by, for example, writing a Block Normal Cache Allocation (BNCA) bit 16, such as in a configuration register 15. When the BNCA indicator 16 is set or active, common memory access instructions are prevented from allocating (e.g., replacing) entries in the cache 22, 26. Only select, predetermined instructions may allocate cache entries. These instructions may include, for example, the PLD instructions for allocating cache entries without reading data into the pipeline. Such instructions are unlikely to be executed by interrupt handling code, and hence interrupt code is unlikely to upset the preloading and cache entry locking operations performed in BNCA mode. Alternatively, in and instruction set architecture that provides for explicit cache locking, such as for example a LPLD (locking preload) instruction, cache allocations during BNCA mode may be restricted to such locking cache allocation instructions.

If an interrupt does occur during BNCA mode—that is, during a cache preloading and locking operation—any memory access instructions will executed properly; they are merely prevented from allocating cache entries. That is, if a memory access instruction misses in the cache 22, 26, a main memory access will be performed, and the instruction or data returned to the pipeline. However, the cache miss processing will be unable to allocate a cache entry. Consequently, if an access to the same or nearby instructions or data is subsequently attempted, it will again miss in the cache, and retrieve the instruction or data from main memory. This will degrade the execution performance of the interrupt routine by introducing repeated, long memory access latencies. However, the interrupt routine is assumed to be both short and rare. On the other hand, considerable performance gains and design simplification are achieved by ensuring that precise, locked cache entries may be established without upset by memory access instructions executing as part of interrupt code.

Figure 3:
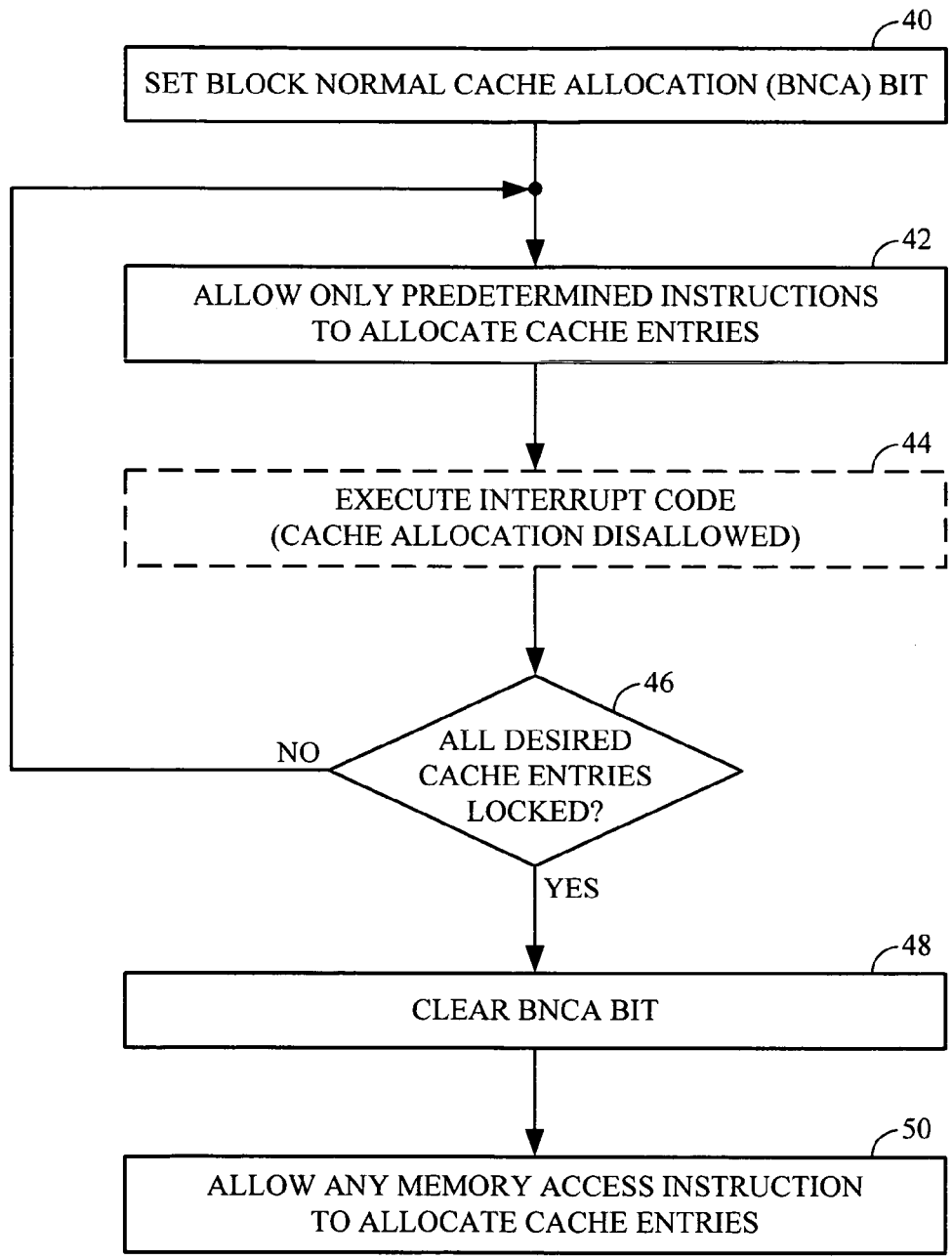
FIG. 3 is a flow diagram of a method of locking cache entries.

The process of establishing locked cache entries according to one embodiment is described with reference to the flow diagram of FIG. 3. The BNCA bit 16 (or other BNCA mode indicator) is set (block 40). This indicates to the circuits controlling the I-cache 22 and D-cache 26 that only certain predetermined instructions (e.g., PLD) are allowed to allocate cache entries (block 42). This allows the processor 10 to establish precise, fixed cache entries, located so as to optimize the normal cache allocation procedure. If an interrupt occurs during BNCA mode, the interrupt code is executed, and all memory access instructions (other than the predetermined instructions) are disallowed from allocating cache entries (block 44). When the interrupt code completes, the processor 10 continues preloading and locking cache entries. When all desired locked cache entries have been established (block 46), the processor 10 exits the BNCA mode and clears the BNCA bit 16 (or other BNCA mode indicator) (block 48). The processor 10 then continues execution, allowing any memory access instruction to allocate cache entries per the normal allocation protocol (block 50). In this manner, the establishment of precise, locked cache entries is protected from upset by interrupt code memory access instructions.

In one embodiment, a single BNCA bit 16 controls BNCA mode for all caches 22, 26. According to another embodiment, a separate BNCA bit 16 controls BNCA mode separately for the I-cache 22 and the D-cache 26. In yet another embodiment, one or both of the I-cache 22 and D-cache 26 may be divided into two or more banks, and each cache bank may independently enter BNCA mode, as indicated by corresponding BNCA bits 16. In still another embodiment, each set of an n-way set associative cache 22, 26 may have an independently enter and exit a BNCA mode, as indicated by corresponding BNCA bits 16. In general, those of skill in the art will readily recognize that the teachings of one or more embodiments discloses herein may be applied to numerous alternative implementations.

Although embodiments of the present disclosure has been described herein with respect to particular features, aspects and embodiments thereof, it will be apparent that numerous variations, modifications, and other embodiments are possible within the broad scope of the present teachings. The present embodiments are therefore to be construed in all aspects as illustrative and not restrictive and all changes coming within the meaning and equivalency range of the appended claims are intended to be embraced therein.

What is claimed is:

1. A method of restricting allocations in a cache, comprising:
   entering a restricted mode and allowing only a predetermined set of one or more types of instructions to allocate cache entries in the restricted mode; and
   exiting the restricted mode to enter a non-restricted mode and allowing any memory access instruction to allocate cache entries in the non-restricted mode.

2. The method of claim 1 wherein the restricted mode is entered by setting a Block Normal Cache Allocation (BNCA) indicator, and exited by resetting the BNCA indicator.

3. The method of claim 2 wherein the BNCA indicator is a bit in a configuration register.

4. The method of claim 1 wherein the predetermined set of one or more types of instructions includes types of instructions operative to load data into the cache and lock the cache entry against replacement.

5. The method of claim 4 wherein separate types of instructions are operative to load and lock instruction cache and data cache entries.

6. The method of claim 1 wherein the restricted and non-restricted modes are separately applicable to a data cache and an instruction cache.

7. The method of claim 1 wherein the cache is divided into two or more banks, and wherein restricted and non-restricted modes are separately applicable to each bank.

8. The method of claim 1 wherein the cache is a set associative cache, and wherein restricted and non-restricted modes are separately applicable to each set.

9. A method of managing a cache, comprising:
   entering a restricted mode wherein only one or more predetermined types of instructions may allocate cache entries;
   allocating cache entries using the predetermined types of instructions; and
   exiting the restricted mode and allocating cache entries for any memory access instruction.

10. The method of claim 9 further comprising, after allocating cache entries using the predetermined types of instructions, locking the allocated cache entries against replacement.

11. The method of claim 9 further comprising:
    processing an interrupt received during the restricted mode; and
    performing memory accesses for memory access instructions in the interrupt code, without allocating any cache entries for the memory access instructions in the interrupt code.

12. The method of claim 9 wherein entering the restricted mode comprises setting a Block Normal Cache Allocation (BNCA) bit in a configuration register, and wherein exiting the restricted mode comprises clearing the BNCA bit.

13. A processor, comprising:
    a cache memory;
    a configuration register having a Block Normal Cache Allocation (BNCA) bit; and
    a cache controller operative to control the allocation of entries in the cache by memory access instructions, and further operative to disallow said allocation, except for a predetermined set of one or more types of instructions, when the BNCA bit is set.

14. The processor of claim 13 wherein said predetermined set of one or more types of instructions includes locking allocation instructions.

15. The method of claim 1, wherein each type of instruction is associated with a different type of operation to be performed.

16. The method of claim 15, wherein the type of operation to be performed is specified by an operation code of the associated instruction.

17. The method of claim 9, wherein each type of instruction is associated with a different type of operation to be performed.

18. The processor of claim 13, wherein each type of instruction is associated with a different type of operation to be performed.

19. A processor, comprising:
    means for storing cache entries;
    means for storing a Block Normal Cache Allocation (BNCA) bit; and
    means for controlling the allocation of entries in the means for storing cache entries by memory access instructions; and
    means for disallowing said allocation, except for a predetermined set of one or more types of instructions, when the BNCA bit is set.

20. The processor of claim 19 wherein said predetermined set of one or more types of instructions includes locking allocation instructions.

21. The processor of claim 19, wherein each type of instruction is associated with a different type of operation to be performed.

* * * * *